United States Patent [19]

Slocum

[11] Patent Number: 5,104,237
[45] Date of Patent: Apr. 14, 1992

[54] SELF-COMPENSATING HYDROSTATIC LINEAR MOTION BEARING

[75] Inventor: Alexander H. Slocum, Everett, Wash.

[73] Assignee: Advanced Engineering Systems Operations & Products, Inc. (AESOP), Concord, N.H.

[21] Appl. No.: 610,535

[22] Filed: Nov. 8, 1990

[51] Int. Cl.⁵ ............................................. F16C 32/06
[52] U.S. Cl. ..................................... 384/12; 384/100; 29/898.02
[58] Field of Search ........................... 384/12, 13, 100; 29/898.02

[56] References Cited

U.S. PATENT DOCUMENTS

| | | | |
|---|---|---|---|
| 2,449,297 | 9/1948 | Hoffer | 384/12 X |
| 3,754,799 | 8/1973 | Hedberg | 384/12 |
| 4,351,574 | 9/1982 | Furukawa et al. | 384/12 X |
| 4,368,930 | 1/1983 | Duchaine | 384/12 |

OTHER PUBLICATIONS

Stansfield, *Hydrostatic Bearings for Machine Tools & Similar Applications* pp. 127-131 (no date).

Primary Examiner—Thomas R. Hannon
Attorney, Agent, or Firm—Rines and Rines

[57] ABSTRACT

A self-compensating linear fluidstatic or hydrostatic bearing and method in which preferably circular annular pressurized-fluid-receiving grooves provided in the opposed carriage bearing surfaces regulate the fluid fed to longitudinal recess pockets formed in the opposing bearing surfaces to provide a thin film or layer of pressurized fluid in the gaps between a bearing rail and the opposing bearing surfaces; the regulation establishing differential pressures in the opposing bearing surface pockets to compensate for loads applied to opposite sides of the bearing.

23 Claims, 5 Drawing Sheets $$\text{DIFFICULTY} = \frac{\text{SPEED} \cdot \text{LOAD CAPACITY}}{\text{ACCURACY}}$$

SELF-COMPENSATING HYDROSTATIC LINEAR MOTION BEARING

The present invention relates to linear motion bearings that are supported by a thin film of pressurized fluid—liquid or gaseous, including among other fluids water and air, and hereinafter sometimes generically referred to and interchangeably as "fluidstatic" or "hydrostatic" bearings.

More specifically, the invention is concerned with a system that includes a straight rectangular cross section bearing rail which guides the linear motion of a bearing carriage that maintains its distance from the bearing rail by means of a thin pressurized film of fluid which emanates from pockets in the bearing carriage surfaces that face the bearing rail and are geometrically opposed to each other. The flow of fluid to the pockets is regulated to allow a differential pressure to exist between the pockets in response to a force being applied to the bearing carriage. As a force is applied to the bearing carriage, the bearing gap on the side to which the force is applied decreases, and the bearing gap on the other side increases. The resistance to fluid flow out of the bearing pocket is inversely proportional to the cube of the gap dimension, which means that a compensated opposed pocket bearing behaves like two resistors in series with each other and in parallel with another series set. Hence as the load is applied, the resistance of the fluid out of the bearing pocket on the load side increases, and decreases out of the other side. The result is that the pressure increases in the pocket on the side to which the load is applied until the load and the differential pressure generated between the two pockets balance. The bearing therefore compensates for the applied load. The resistance of fluid flow into the pockets is called compensation.

BACKGROUND

In the prior art, three types of compensation have been proposed. Fixed compensation involved using a capillary or orifice to act as a fixed value resistance. Variable compensation included the use of diaphragm and valves to provide a flow inversely proportional to the pocket resistance, thereby creating a larger pressure differential than created with the use of a fixed compensation device. Both of these types of compensation, however, must be tuned to the bearing gap.

As smaller and smaller bearing gaps are sought in order to increase the performance of the bearing, manufacturing errors make the use of either of these types of compensation more and more difficult by requiring hand-tuning of the compensation device. Since a machine tool with three axes may have 36 bearing pockets, the labor required becomes prohibitive.

A third type of compensation is called self-compensation because it uses the change in bearing gap to allow the bearing to change the flow of fluid to the pockets, by itself. Existing self compensation methods have utilized linear passageways on the face of the bearing and have been directed primarily to applications in spindles, as later more fully discussed. These designs have not, however, proven themselves to provide acceptable performance in the commercial sector because of inefficient flow patterns that are difficult analytically to determine, particularly the flow field near the end of the linear grooves, often resulting in improper resistance design and which then require hand-tuning of the compensator. Difficulty has also been experienced with prior linear groove self-compensation units because the geometry has not always been realistically implementable.

Underlying the present invention, is the discovery that through the use of a self-compensating unit in the form of a pressurized annulus that feeds the fluid to a hole in its center which is then connected to a bearing pocket on the opposite side of the bearing, the limitations of such prior art approaches are admirably eliminated. The annulus, however, is easy to manufacture and is more structurally stable than linear passages; and, furthermore, the fluid flow from the circular annulus to the center feed hole can be analytically determined with great accuracy.

OBJECTS OF INVENTION

Accordingly, it is an object of the present invention to provide a new and improved self-compensating fluid or hydrostatic linear motion bearing and method, void of prior art disadvantages and that involves a novel mechanism to regulate the flow of pressurized fluid into opposed pocket hydrostatic bearings, whereby the regulation of fluid flow is proportional to the bearing gap and is controlled by an analytically representable system on the surface of the bearing itself.

Another object is to provide a novel bearing construction in which the fluid resistance is of geometric pattern on the bearing carriage surface itself so at the nominal equilibrium position of the bearing, the resistance of the mechanism will be in desired proportion to the fluid resistance out of the bearing pocket regardless of the magnitude of the nominal equilibrium gap; thereby obtaining an easy-to-manufacture hydrostatic bearing that requires no special hand tuning of its performance.

Another object is to provide an inexpensive modular bearing design that allows machine tool builders to utilize hydrostatic bearings with the same ease that they heretofore have utilized modular rolling element bearings; but because the bearings are hydrostatic they will attain order an of magnitude increase in performance.

Still a further object is to provide such a novel bearing in which it is insured that all regions of the bearing receive sufficient fluid flow even when the bearing is moving at high speed.

These and still further objectives are addressed hereinafter are more particularly delineated in the appended claims.

SUMMARY

In summary, however, from one of its viewpoints, the invention embraces, in a linear motion fluidstatic bearing having opposed carriage bearing surfaces receiving a bearing rail therealong and therebetween and each bearing surface having similar and symmetrical pockets in the surface from which pressure fluid emanates to provide a thin film of fluid interposed in the gaps between the rail and the carriage surfaces, a method of self-compensating for load variation on either side of the bearing, that comprises, introducing on each bearing surface, longitudinally spaced from the corresponding pocket, a pressurized fluid-receiving groove of analytically representable geometry from which the fluid is fed externally of said surfaces from each groove to the pocket of the oppositely disposed surface, with the resistance to fluid flow out of the groove being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with a differential pressure being established in the opposite pockets to compensate for such applied load.

Preferred and best mode designs are hereinafter described.

DRAWINGS

The invention will be described with reference to the accompanying drawings in which.

THE INVENTION

The drawings include a mechanism or system that supports a machine tool table using a pressurized thin fluid film to provide accurate frictionless motion capability. To maximize versatility, it is desired to provide modular bearing carriages to which a machine component, such as a table, can be bolted. To provide accurate linear motion, five degrees of freedom must be restrained. Two of the five degrees of freedom are translational, and three of the degrees of freedom are rotational. To maximize resistance to rotational motions, bearings should be spaced as far apart as possible which, in general, means that two long straight structural members, bearing rails, need to be provided along with at least three bearing carriages, but often four or more to give added stiffness to the table, moving along the rails.

Figure 1:
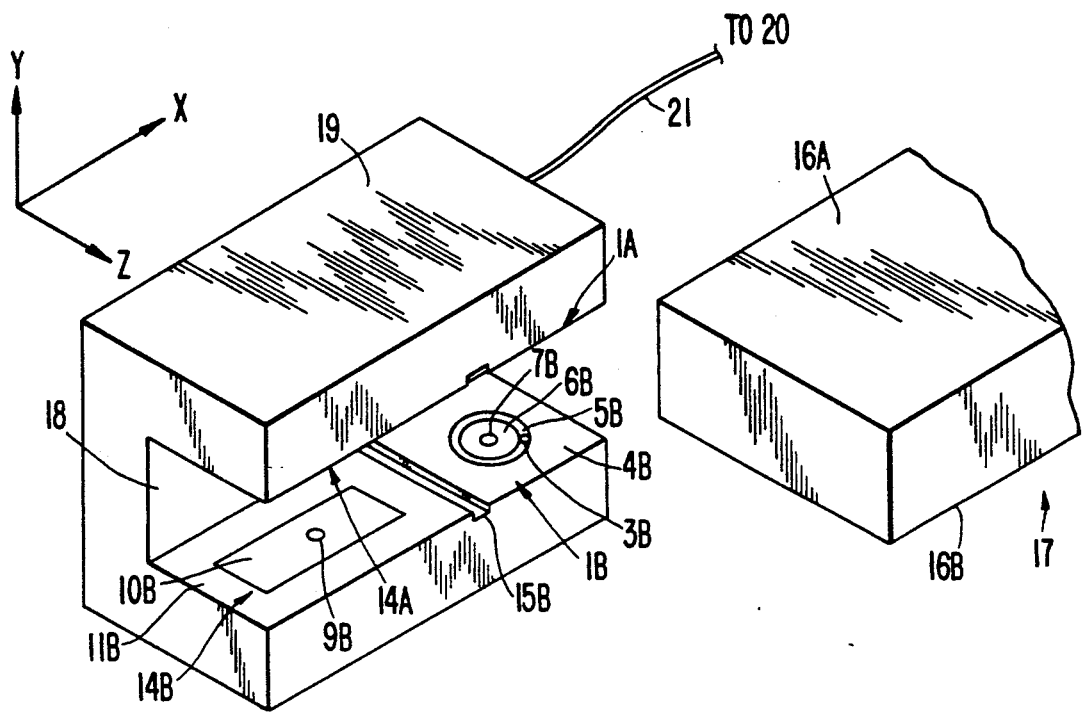
FIG. 1 is an isometric exploded view of a bearing constructed in accordance with the present invention, illustrating a single degree of restraint bearing carriage that moves in the X direction, and the Y direction position of which is guided by hydrostatic bearing components and the bearing rail.
Figure 2:
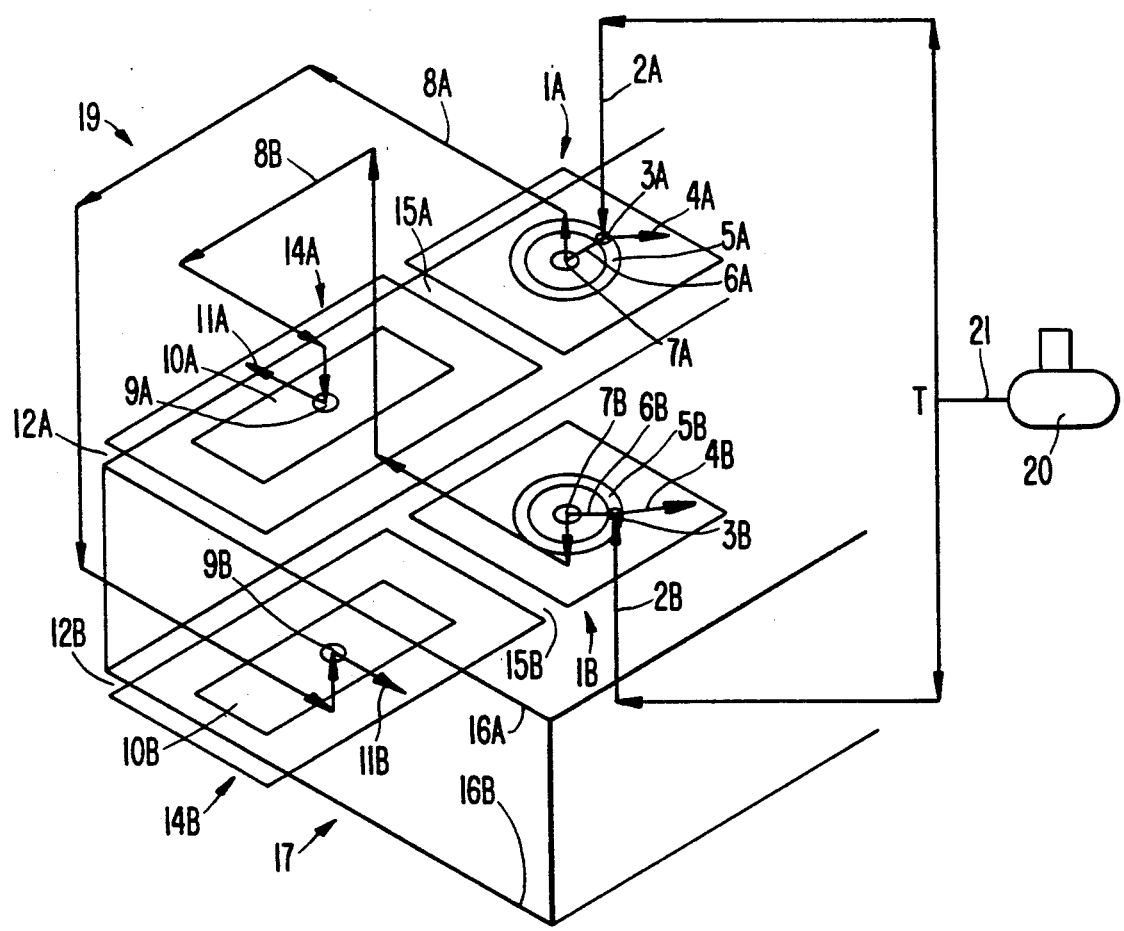
FIG. 2 is an isometric schematic of the operation of the system of FIG. 1, showing the self-compensating fluid flow regulating units, the bearing pockets and lands, and the fluid flow through the bearing.

As shown in FIGS. 1 and 2, a bearing carriage 19 of the invention moves along a bearing rail 17. The motion of the bearing carriage in the Y direction is guided with respect to the upper and lower surfaces of the bearing rail, 16A and 16B, respectively, by longitudinally extending bearing surfaces 14A and 14B, respectively. As more particularly shown in FIG. 2, the bearing surfaces 14A and 14B contain similar opposed longitudinally extending depressed pocket regions 10A and 10B, respectively, that are filled with high pressure fluid from intermediate apertures 9A and 9B as later explained. Fluid flow to the pockets 10A and 10B is regulated by respective similar opposed self-compensation units 1B and 1A containing circular annular grooves 5A and 5B and between which and the pockets 10A and 10B, there are provided transversely extending grooves or recesses 15A and 15B which allow leakage flow from the compensation units 1A and 1B in the Z direction without shorting to the respective bearing surfaces 14A and 14B. The pockets 10A and 10B, transverse recesses or grooves 15A and 15B, and annular circular grooves 5A and 5B are thus positioned in seriatum, longitudinally along the bearing surfaces 14A and 14B. The Y position of the bearing carriage 19 with respect to the bearing rail 17 is dependant upon the Y direction load applied to the bearing carriage, the bearing gaps 12A and 12B, and the relative fluid resistances of the bearing pockets and self-compensation units.

Figure 3:
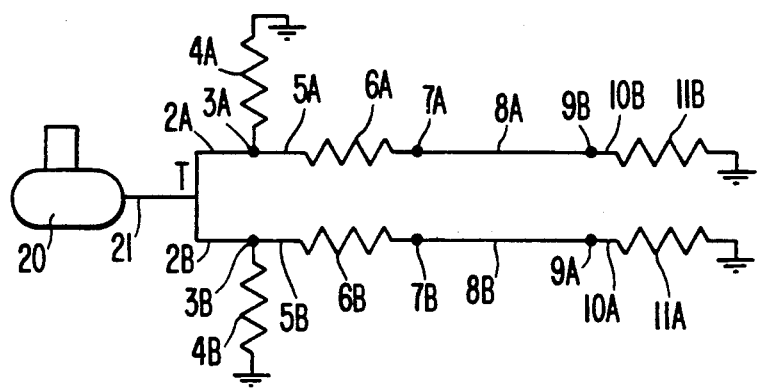
FIG. 3 is a schematic diagram of the fluid resistances in the bearing shown in FIGS. 1 and 2.

FIG. 3 shows the equivalent fluid flow resistance diagram for the system of FIGS. 1 and 2. Fluid from a constant pressure source 20 enters the bearing carriage through a feed hose 21. The flow divides at a T junction and is directed to the self-compensation units 1A and 1B via fluid lines 2A and 2B, respectively. The fluid enters the self-compensation units 1A and 1B through holes 3A and 3B in the respective annular grooves 5A and 5B at the supply pressure. Some of the fluid leaks out of the annular grooves across the supply lands at 4A and 4B external to the annular grooves 5A and 5B, but the leakage will be low, and if the pump is properly sized no detrimental effects on the performance of the system will be experienced. In fact, this outward flow of fluid acts to cleanse the bearing and is thus actually desirable. The supply lands resistances $R_{4A}$ and $R_{4B}$ to this leakage flow will approximately be a function of the fluid viscosity $\mu$, bearing gaps 12A and 12B, referred to as $h_{12A}$ and $h_{12B}$, respectively, in the following equation, and the annuli outer diameters, both equal to $D_3$, and the outer diameters of the circles of the grooves 5A and 5B, both equal to $D_4$, inscribed in the outer perimeters of the self-compensating units:

$$R_{4A} = \frac{6\mu \text{Log}_e\left(\frac{D_4}{D_3}\right)}{\pi h_{12A}}; \tag{1}$$

$$R_{4B} = \frac{6\mu \text{Log}_e\left(\frac{D_4}{D_3}\right)}{\pi h_{12B}} \tag{2}$$

The fluid in the annuli 5A and 5B will always want to flow to lower pressure regions and hence flow will occur across the respective annular compensation lands 6A and 6B. The resistances $R_{6A}$ and $R_{6B}$ to flow across these lands depends on the inner and outer diameters $D_1$ and $D_2$ thereof, which in this example are the same for each self-compensation unit 1A and 1B, and the bearing gaps 12A and 12B which, as before stated, are referred to here as $h_{12A}$ and $h_{12B}$:

$$R_{6A} = \frac{6\mu \text{Log}_e\left(\frac{D_2}{D_1}\right)}{\pi h_{12A}}; \tag{3}$$

$$R_{6B} = \frac{6\mu \text{Log}_e\left(\frac{D_2}{D_1}\right)}{\pi h_{12B}} \tag{4}$$

After crossing the compensation lands 6A and 6B, the fluid enters respective central holes 7A and 7B, respectively, and then travels through respective passageways 8A and 8B in the bearing carriage 19, FIGS. 2 and 3. The bearing gaps are typically on the order of 0.01 mm. so long as the passageways are at least a few millimeters in diameter, the passageway resistance will be insignificant compared to the resistance of the compensation lands. The passageways direct the fluid from the self compensation units 1A and 1B to the opposite bearing surfaces 14B and 14A, respectively. Hence the fluid is fed to the bearing surface on the opposite side of the bearing carriage 19 as the self-compensation unit. Fluid from passageways 8A and 8B enter the bearing surfaces 14B and 14A without resistance through interior, preferably central holes 9B and 9A, respectively. The fluid keeps the bearing pockets 10B and 10A pressurized; and then the fluid then flows out of the bearing surfaces over the respective lands 11B and 11A.

The resistance to fluid flow out of the bearing surfaces depends on the width and length of the same, the width and the length of the pockets, the bearing gaps, and the fluid viscosity. It is assumed here that the bearing surfaces have equal dimensions, although it will be evident to one skilled in the art how to make calculations for unequal size bearings, where the bearing surface width is a, the bearing length is b, the land width is l, and the radius of the bearing pocket corners is $r_p$. The resistances $R_{11A}$ and $R_{11B}$ to fluid flow out of the bearing surfaces 14A and 14B are, respectively:

$$R_{11A} = \frac{6\mu}{h_{12A}^3 \left[ \dfrac{\pi}{\text{Log}_e\left(\dfrac{r_p + l}{r_p}\right)} + \dfrac{a + b - 4(l + r_p)}{l} \right]}, \tag{5}$$

and $$R_{11B} = \frac{6\mu}{h_{12B}^3 \left[ \dfrac{\pi}{\text{Log}_e\left(\dfrac{r_p + l}{r_p}\right)} + \dfrac{a + b - 4(l + r_p)}{l} \right]} \tag{6}$$

With the equivalent circuit shown in FIG. 3, given a supply pressure $P_S$, the pressures $P_{10A}$ and $P_{10B}$ in the bearing surface pockets 10A and 10B, respectively, will be:

$$P_{10A} = \frac{P_S R_{11A}}{R_{6B} + R_{11A}} \text{ and} \tag{7}$$

$$P_{10B} = \frac{P_S R_{11B}}{R_{6A} + R_{11B}} \tag{8}$$

The net force on the bearing carriage generated by the difference in bearing pressures will depend on the effective area of the bearing surfaces. Note that the contribution to this area by the self-compensation units is negligible. For a rectangular pocketed bearing surface, the effective area A is readily shown by those skilled in the art of fluid bearing design to be:

$$A_{effective} = (a - 2l)(b - 2l) + r_p^2(\pi - 4) + \tag{9}$$

$$l[a + b - 4(l + r_p)] + \pi \left[ \frac{l(2r_p + l)}{2\text{Log}_e\left(\dfrac{r_p + l}{r_p}\right)} - r_p^2 \right].$$

The force F that can be supported by the bearing is thus:

$$F = A_{effective}(P_{10A} - P_{10B}). \tag{10}$$

In order to maximize the performance of the bearing, the above equations must be combined to show the load capacity as a function of bearing displacement and relative fluid resistance of the self-compensation units and the bearing surfaces.

When the bearing carriage is unloaded, the values of $h_{12A}$ and $h_{12B}$ will be equal to the nominal gap h. The displacement in the Y direction of the bearing carriage under load will be $\delta$. Note that the respective fluid resistances have the same proportionality factors that multiply the inverse cubes of the bearing gaps. If the ratio of the compensation unit resistance factor to the bearing resistance factor is $\gamma$, then combining the above equations yields an equation for the load capacity F:

$$F = A_{effective}P_S \left( \frac{\frac{1}{(h-\delta)^3}}{\frac{\gamma}{(h+\delta)^3} + \frac{1}{(h-\delta)^3}} - \frac{\frac{1}{(h+\delta)^3}}{\frac{\gamma}{(h-\delta)^3} + \frac{1}{(h+\delta)^3}} \right). \quad (11)$$

Differentiating the load capacity with respect to the displacement $\delta$ yields an expression for the stiffness K of the bearing:

$$K = A_{effective}P_S \left\{ \frac{-3}{\left(\frac{\gamma}{h^3} + (h-\delta)^{-3}\right)^2 (h-\delta)^7} + \right.$$

$$\frac{3}{\left(\frac{\gamma}{h^3} + (h-\delta)^{-3}\right)(h-\delta)^4} -$$

$$\frac{3}{\left(\frac{\gamma}{h^3} + (h+\delta)^{-3}\right)^2 (h+\delta)^7} +$$

$$\left. \frac{3}{\left(\frac{\gamma}{h^3} + (h+\delta)^{-3}\right)(h+\delta)^4} \right\} \quad (12)$$

Figure 6:
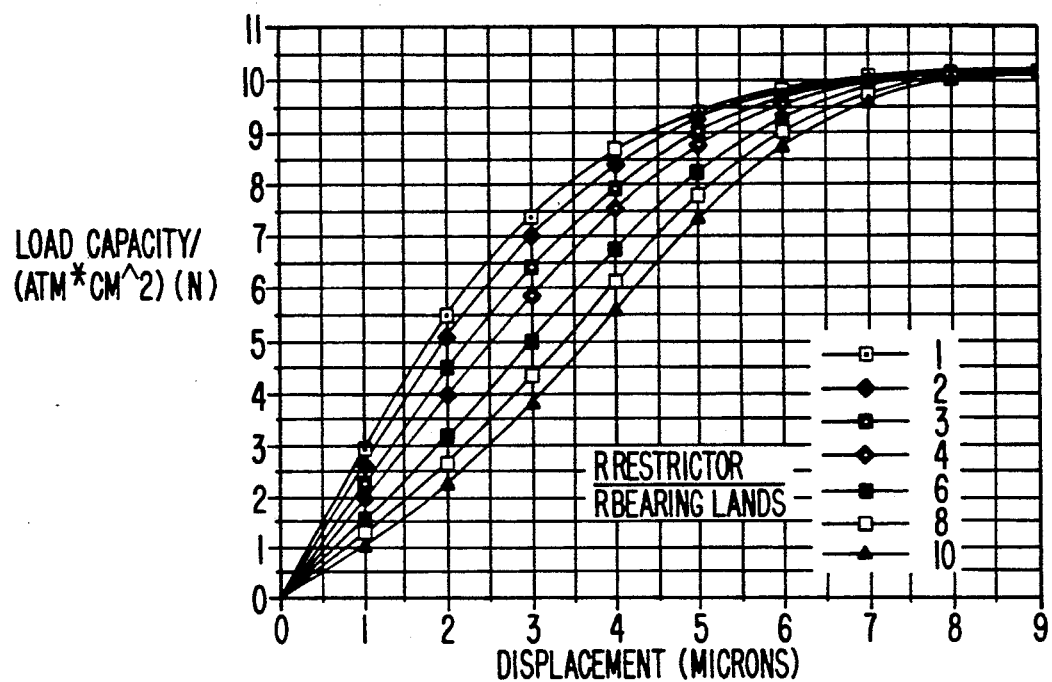
FIG. 6 is a graph of the load capacity versus displacement for the single degree of restraint bearing shown in FIGS. 1 and 2, that illustrates the effect of varying the relative fluid resistance of the self-compensation device and the bearing lands over which the fluid must travel to flow from the bearing pocket to the atmosphere.
Figure 7:
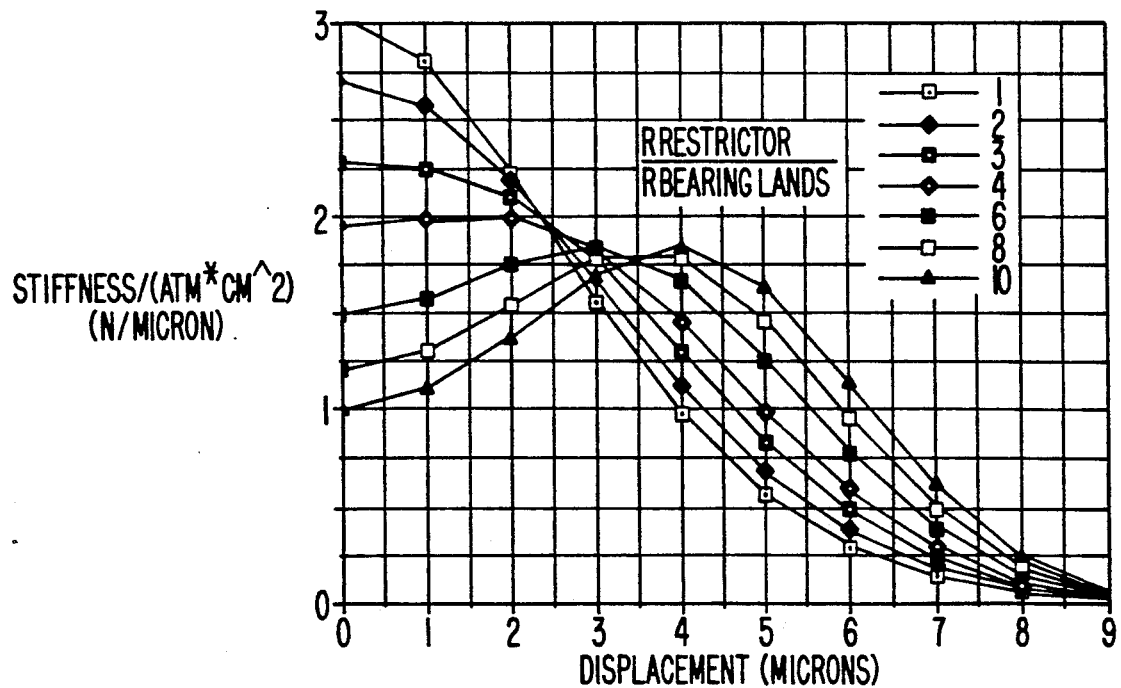
FIG. 7 is a graph of the stiffness versus displacement for the single degree of restraint bearing shown in FIGS. 1 and 2, that shows the effect of varying the relative fluid resistance of the self compensation device and the bearing lands over which the fluid must travel to flow from the bearing pocket to the atmosphere.

FIGS. 6 and 7, respectively, show the load capacity and stiffness per unit effective area and supply pressure as a function of bearing displacement and relative resistance of the compensation units and the bearings. The total resistance to flow of fluid out of the bearing carriage will be the appropriate sum of the resistances in FIG. 3.

As an example, consider the following output from a spreadsheet that implements the above equations for the design of the present invention concentrated with the performance of prior art fixed resistance capillary compensated bearings:

program based on exact analytical expressions for the bearing performance. Such bearing performance results compared with a conventional fixed resistance capillary compensated bearing show the superior load capacity and stiffness performance of the self-compensated bearing.

As shown in the drawings, for this implementation, the pockets 10A and 10B are substantially rectangular of width comparable to the outer diameter of the annular grooves 5A and 5B, with the annulus and the more comparable width of the transverse recess 15A (15B) being small compared with the width and longer longitudinal length of the pockets.

Figure 4:
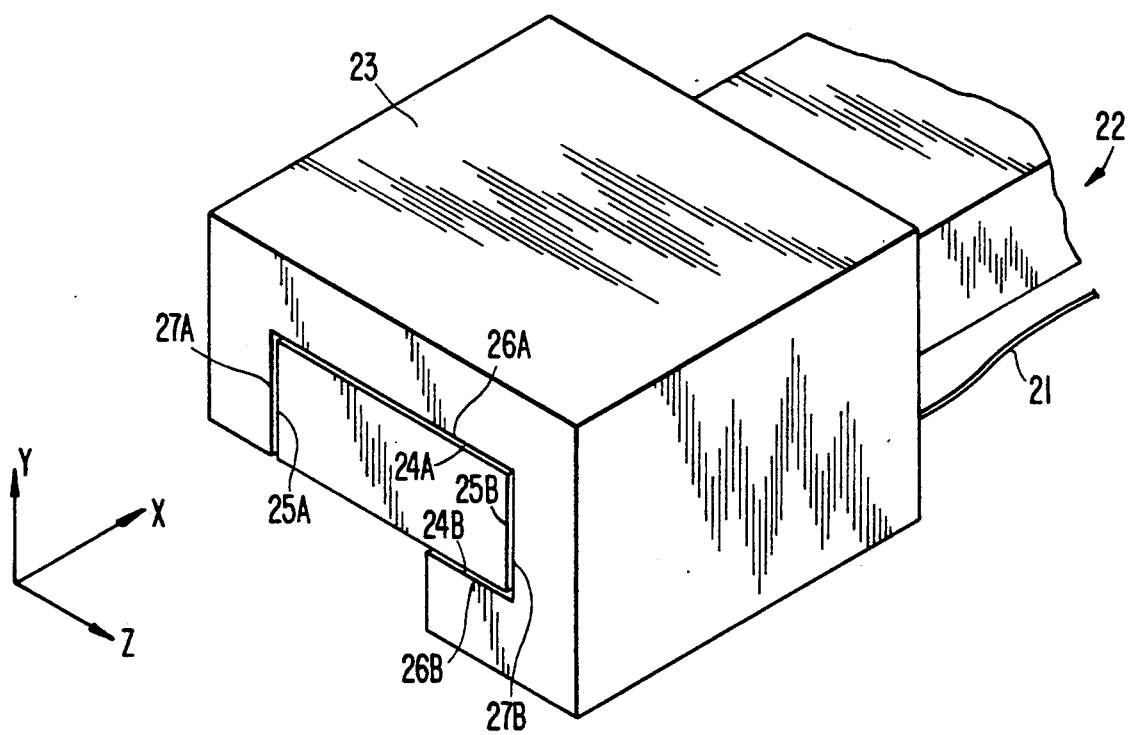
FIG. 4 is an isometric view of a two-degree of restraint bearing carriage that moves in the X direction and whose Y and Z direction position is guided by the hydrostatic bearing components and the bearing rail.
Figure 5:
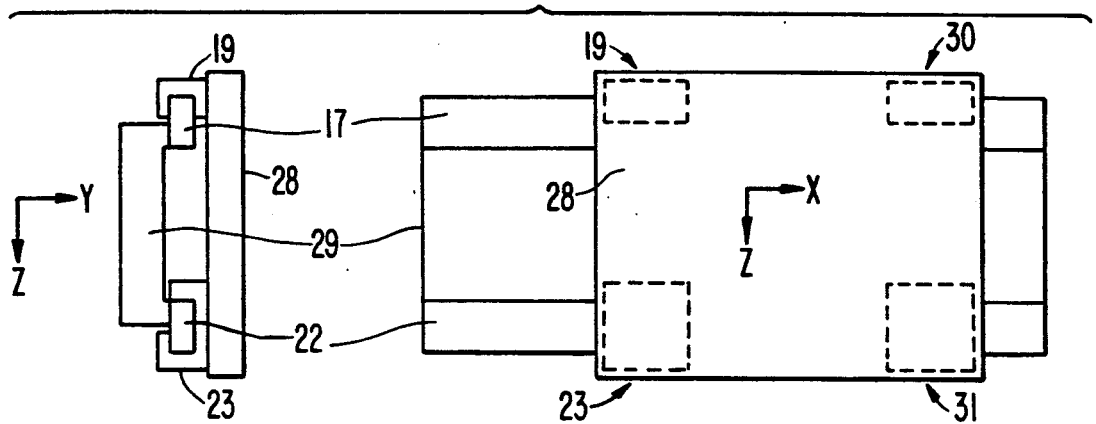
FIG. 5 is a top and end view of a machine tool table that is free to move in the X direction but whose motions along the Y and Z directions and about the X, Y, and Z axes are restrained by the combined actions of two single degree of restraint bearing carriages, such as shown in FIG. 1, and a pair of two-degree of restraint bearing carriages such as shown in FIG. 4.

As shown in FIG. 5, and discussed earlier, in order properly to support a linear motion machine tool table 28, a master bearing rail 22 may be used to provide restraint in the Y and Z directions, and a secondary bearing rail 17 to provide restraint in the Y direction. Both bearing rails are secured to a machine base 29. On the master rail are bearing carriages 23, shown in FIG. 4, and an identical unit 31. These carriages have orthogonal sets of opposed self-compensated bearings and thus each carriage can resist forces in the Y and Z directions. The bearings 26A and 26B work as a pair similar to bearings 14A and 14B in the bearing carriage in FIGS. 1 and 2. As a load is applied in the Y direction, the bearing gaps 24A and 24B change, which causes a pressure differential to occur, as discussed above, thereby compensating for the applied load. Similarly, bearings 27A and 27B support loads applied in the Z direction by pressure differentials established due to changing gap dimensions 25A and 25B. Fluid is supplied to the bearing carriage via the line 21 from the pump 20.

On the secondary bearing rail are carriages 19, discussed previously, and an identical carriage 23. Both of

| | | | |
|---|---|---|---|
| Supply Pressure $P_s$ (N/m 2, psi, atm) | 2,028,600 | 294 | 20 |
| Viscosity $\mu$ (N-s/m 2) (water) | 0.001 | | |
| Nominal bearing gap h (m, in) | 0.000010 | 0.000394 | |
| Width b (m, in) | 0.0400 | 1.57 | |
| Length a (m, in) | 0.0500 | 1.97 | |
| Land width l (m, in) | 0.0100 | 0.39 | |
| Pocket radius $r_p$ (m, in) | 0.0050 | 0.20 | |
| Fluid resistance across bearing lands | 3.91E + 10 | | |
| Effective area per pad pair (cm 2, in 2) | 21.72 | 3.37 | |

| Results for six pad pairs acting to support a carriage: | Self-compensating: | | Capillary: | |
|---|---|---|---|---|
| $R_{restrictor}/R_{bearing}$ | 3 | | 1 | |
| Load capacity at 50% gap closure (N, lb) | 23,470 | 5,274 | 17,456 | 3,923 |
| Initial stiffness (N/$\mu$m, lb/$\mu$in) | 5,948 | 33.98 | 3,966 | 22.66 |
| Stiffness at 25% gap closure (N/$\mu$m, lb/$\mu$in) | 5,096 | 29.12 | 3,628 | 20.72 |
| Stiffness at 50% gap closure (N/$\mu$m, lb/$\mu$in) | 2,158 | 12.34 | 2,498 | 14.28 |
| Flow (liters per minute) | 1.5 | | 1.2 | |
| Pump power (Watts) | 51 | | 40 | |
| D2 (m) | 0.0164 | | | |
| D1 (m) | 0.0100 | | | |
| Compensator land width (mm) | 3.18 | | | |
| D4 (m) | 0.0400 | | | |
| D3 (m) | 0.0264 | | | |
| Leakage resistance | 9.96E + 10 | | | |
| $R_{leakage}/R_{restrictor}$ | 0.85 | | | |

These results show the ease with which the design claimed herein can be formulated using a spreadsheet these bearing carriages support loads only in the Y direction. Note that the gap 18 is an order of magnitude larger than the nominal bearing gap h. This ensures that the single degree of restraint bearing does not resist motion in the Z direction; therefore the relative angular alignment about the Y axis of the two bearing rails is not critical, which helps to reduce manufacturing costs.

Because the rail 17 is located a distance apart from the rail 22, resistances to moments about the X axis will also be provided. Similarly, because of the X direction spacing between the sets of carriages 19, 23 and 30, 31, moments about the Z axis are resisted. The X direction spacing between the carriages 23 and 31 insures that moments about the Y axis are resisted; and the Z direction spacing of the bearing carriages 19, 30 and 23, 31 enables moments about the X axis to be resisted.

The objectives of the invention are thus attained, generally, in a mechanism providing smooth accurate linear motion by means of one or two rectangular cross-section straight bearing rails 17 which guide the motion of one or more bearing carriages 19 which support a table surface the motion of which is to be guided along a linear path. The bearing carriages 19 are kept from making mechanical contact with the bearing rails 17 by a thin film of pressurized fluid that flows from sets of opposed recess pockets 10A and 10B in selected surfaces of the carriages that face the bearing rails. The flow of fluid to the pockets is regulated to allow a differential pressure to be established between the pockets, thereby compensating for changes in applied loads to the carriage. This fluid flow regulation is provided by applying pressurized fluid in an annular recess groove (5A, 5B) from which fluid flows to a feedhole (7A, 7B) in the center of the annulus, connected by means of internal or external passageways (8A, 8B) to the bearing pocket located on the other bearing carriage surface from the feedhole aperture (10A, 10A).

The resistance to fluid flow from the annular groove to the feedhole is designed to be equal to a proportion of the resistance to fluid flow out of the bearing pocket when the bearing is at its nominal equilibrium position unloaded by external forces. As external loads are applied, the fluid resistance of the regulator, that supplies fluid to the bearing pocket on the side of the load, decreases rapidly in the same proportion that a decrease occurs in resistance to fluid flow out of the bearing pocket opposite to the applied load. Conversely, the regulator that supplies fluid to the bearing pocket opposite to the applied load, has its resistance decreased in the same proportion that an increase occurs in resistance to fluid flow out of the bearing pocket on the side of the load. The result is a rapid pressure rise in the bearing pocket on the side of the load and a rapid pressure decrease in the bearing pocket opposite to the applied load. Hence a pressure differential is quickly established that acts to compensate for the applied load. The action of the regulation devices is based on the geometry of the bearing itself and upon the motion of the bearing itself; and therefore the design has been termed self-compensating.

Figure 8:
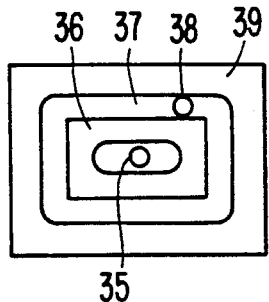
FIG. 8 shows a prior art type of self-compensating fluid flow regulation device.
Figure 9:
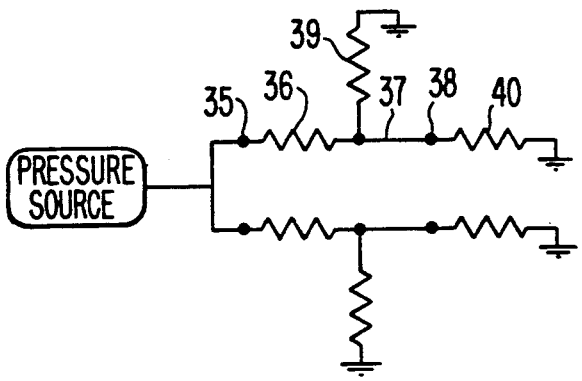
FIG. 9 is a schematic diagram of the fluid resistances in the self-compensating fluid flow regulation device shown in FIG. 8.

At this point, the departure of the invention from prior art will be evident. FIG. 8 shows a prior art self-compensating fluid flow regulating unit described by Stansfield (F. M. Stansfield *Hydrostatic Bearings for Machine Tools and Similar Applications*, pages 127-131). FIG. 9 shows an equivalent resistance schematic for this type of bearing. Fluid enters the compensation device through hole 35 which would be connected to the pressure source. The fluid flows across the compensator lands 36 and into a rectangular annulus 37. It then flows into a passage 38 which takes it to the bearing located opposite of the self-compensating unit. The resistance of this bearing is shown as the resistor 40. It will be noted that there is a large flow in that the fluid can leak from the rectangular annulus 37 directly to ground via the land 39. This greatly decreases the performance of the bearing because it acts like a short circuit to ground. This design, however, may be used for spindles because the leakage flow from the restrictor to ground is actually pumped into the adjacent pocket by the rotating spindle; Stansfield himself conceding that this technique "is applicable only to journal bearings". If this design were to be attempted with opposed pad linear motion bearings as for the purposes of the present invention, the stiffness would be low and the leakage flow would be high.

Figure 10:
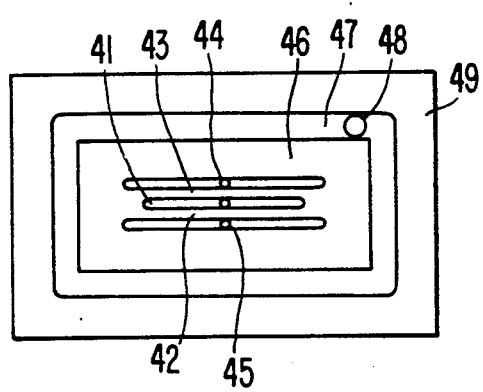
FIG. 10 shows another prior art type of self-compensating fluid flow regulation device.
Figure 11:
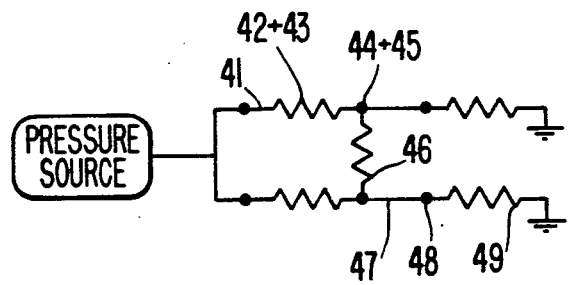
FIG. 11 is a schematic diagram of the fluid resistance in the self-compensating fluid flow regulation device shown in FIG. 10.

FIG. 10 shows another prior art self-compensating fluid flow regulating unit used by a German manufacturer, Zollern Inc. The unit is actually located within the bearing to which the opposite self-compensating unit would supply fluid. FIG. 11 shows an equivalent resistance schematic for this type of bearing. Fluid from the pressure source enters the groove 41 and out across the lands 42 and 43 to the compensator collection grooves 44 and 45. Grooves 44 and 45 are connected to a common passageway that delivers the fluid to the opposed bearing pad. Fluid from the compensator unit opposite to the one shown flows through hole 48 into the rectangular annulus shaped pocket 47. Fluid then flows out of the bearing across land 49. Note that fluid from the compensator collection grooves 44 and 45 can leak across lands 46 to the rectangular annulus 47. This results in decreased performance. Furthermore, the fact that a large portion of the bearing area is taken by the compensator further reduces the bearing performance.

Figure 12:
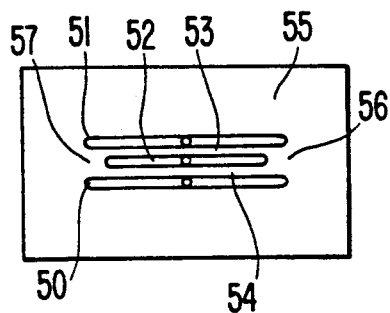
FIG. 12 shows still a further prior art type of self-compensating fluid flow regulation device.
Figure 13:
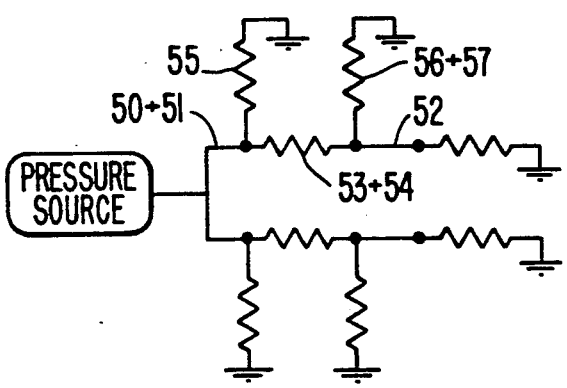
FIG. 13 is a schematic diagram of the fluid resistances in the self-compensating fluid flow regulation device shown in FIG. 12.
Figure 14:
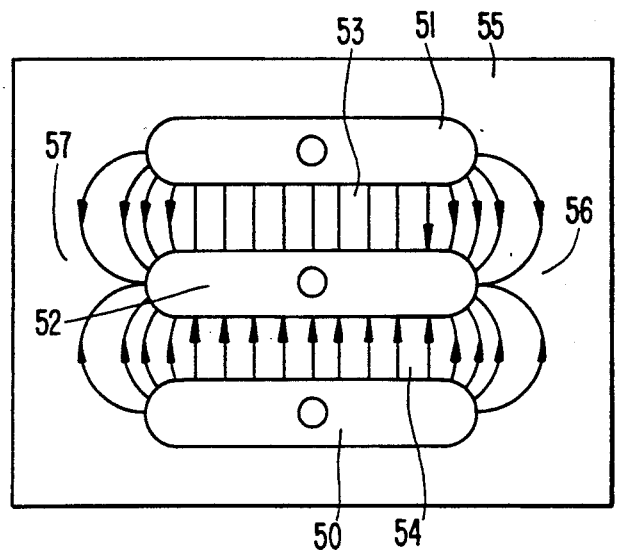
FIG. 14 is a schematic of the flow field in the self-compensating fluid flow regulation device of FIGS. 12 and 13.

FIG. 12 shows still another self-compensating fluid flow regulating unit patented by Hoffer in 1948 (U.S. Pat. No. 2,449,297). The grooves 50 and 51 are connected to the pressure source. Fluid flows across the lands 53 and 54 into the compensation collector groove 52. Leakage flow from the pressure supply grooves occurs over the lands 55. Leakage flow, however, occurs from the compensator collector groove 53 across the lands 56 and 57. If the pressure supply grooves are not longer than the collector groove and the lands 56 and 57 are short, then there will be short circuit resistance to ground as is the case with the design shown in FIG. 8. If the pressure supply grooves are longer than the collection groove 52 and/or the land 56 is long, then the net effect will be a flow of fluid into the end of the collector groove as shown in the illustrated flow field in FIG. 14. It would be theoretically possible to tune the geometry of the system so there is no net flow in or out of the end of the collector groove; however, this would require extensive finite element modeling and testing. Thus it would be expensive to design a new bearing for a customer's special needs. The most often achieved result with this design is that fluid flows into the ends of the compensator collection groove 52. The end zone, further, is exposed to dirt or velocity effects and deleteriously plays a part in the performance of the bearing. In fact, as shown in FIG. 14, there is a net circulatory flow that actually will help to pump dirt into the end of the compensation collector groove when the bearing is moving.

As contrasted from the above and other prior art techniques, the novel circular self-compensation unit presented by the present invention, on the other hand, is demonstrated to be fully deterministic: exact equations have been presented for the design of such units and the prediction of bearing performance. Tests show that the bearing performs precisely as expected, this being one of the keys to successful modular bearing design in accordance with the invention, because it enables the manufacturer to respond quickly and with minimum cost to customers' changing needs.

Figure 15:
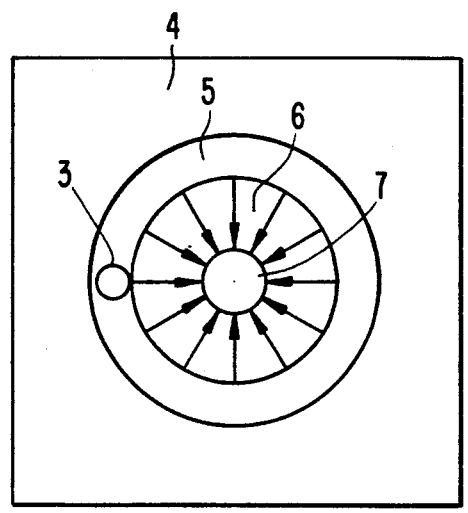
FIG. 15 is a schematic of the flow field in the self-compensating fluid flow regulation device of the present invention.

Rather than guess as to what the flow field may be at the end of the compensation and supply grooves, as in the prior art, the present invention insures that there is no question as to what the flow field would look like. In order for the flow field to be fully deterministic as in the invention, thus, it must be fully symmetrical. Planar symmetry about all axes implies a circle; and hence the development of the circular self-compensation units of FIGS. 1, 2 and 15. The design is elegant and novel because of its simplicity and deterministic nature. Furthermore, the circular annulus (6A, 6B) is structurally superior to prior art line elements and the uniform radial leakage flow from the pressure annular grooves (5A, 5B) across the lands (4A, 4B) prevents dirt from entering the self-compensating unit. Hence the novel design presented herein is not only deterministic and structurally superior, but it is also self cleaning.

These advantages are the key to allowing the hydrostatic bearings of the invention to advance the state-of-the-art of machine tool design. As shown in the cost curves of FIG. 16, hydrostatic bearings are more expensive then rolling element bearings, but hydrostatic bearings can deliver substantially greater performance. Specifically, hydrostatic bearings are insensitive to surface finish effects; they have zero static friction; they have a zero wear rate, they have a large load capacity and stiffness; they have excellent damping capacity; and they are immune to overloads which could cause rolling element bearings to indent the surface of the bearing rail.

Heretofore, however, hydrostatic bearings have not been widely applied because the oil which is commonly used is messy and is a fire hazard; the compensation units tend to clog or become damaged by dirt; there is often great difficulty and expense in tuning the compensation unit fluid resistance to the resistance of the bearing lands; and heat is generated by the viscous shear of the fluid within the bearing.

Figure 16:
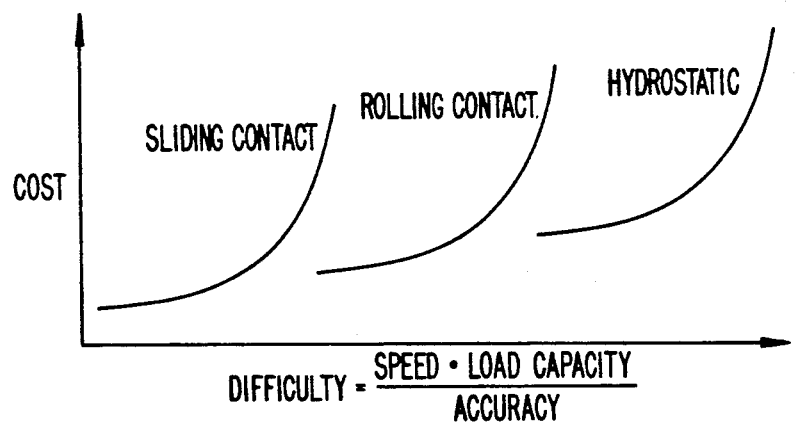
FIG. 16 is a graph illustrating the relative merits of currently available bearing technologies as a function of cost.

The novel design of the invention, on the other hand, is so deterministic that it allows the engineer to choose bearing gaps and fluids to eliminate these problems; and therefore it helps to shift the hydrostatic curve in FIG. 16 down, so that the hydrostatic bearings of the invention become more competitive with rolling element bearings in regions of application overlap. Specifically, water can be used as the hydrostatic fluid because the gap can easily be made very small as shown in the spreadsheet presented above. Water has a high heat capacity and excellent thermal conductivity. As a result, the heat generated by the bearing will be no more than rolling elements generate as the cycle rapidly. Water, furthermore, can actually be pre-cooled to allow the bearing to be isothermal while this has been done on oil hydrostatic bearings used before, the use of water will make this implementation easier.

One of the further issues confronting bearing designers is speed. As shown in FIG. 16, however, speed increases the difficulty coefficient. For a conventional hydrostatic bearing, flow is forced out across the lands; but, as the bearing moves, on one side the fluid is being forced back in by the relative shearing motion between the bearing and the rail. In fact, the maximum velocity $V_{max}$ occurs where the flow in equals the flow out, and this occurs at:

$$V_{max} = \frac{P_S h^2}{6 l \mu}. \tag{13}$$

Even when water is used as the hydrostatic fluid, the velocity can quickly reach a low value as the bearing gap is decreased in order to reduce flowrate and hence pumping power requirements.

The self-compensating unit of the invention, as shown in FIGS. 1 and 2 provides a leakage flow which for one direction of bearing motion is pumped into the bearing, thereby preventing air from getting into the bearing. At speed, the leakage flow from the leakage lands 4A and 4B is carried across the channels 15A and 15B, respectively, and flows against the bearing lands 11A and 11B, respectively. The pumping action produces only a very low pressure; hence it will not affect the bearing performance. As the velocity allowed by Equation 13 is surpassed, however, fluid is drawn into the bearing instead of air. If air were to be drawn into the bearing, a drastic loss of stiffness may occur and the bearing could ground out. The current method for preventing air from being drawn into the bearing is to use a large gap and a high pressure—but this causes excessive heat to be generated by the pumping power required to generate the resulting large flow.

Figure 17:
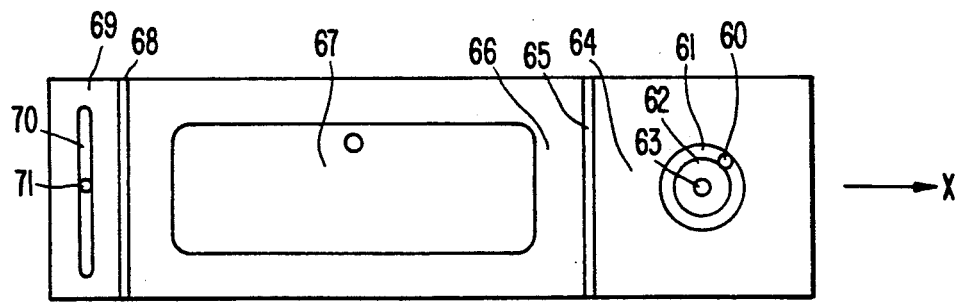
FIG. 17 is a schematic of a preferred embodiment of the present invention, showing a bearing surface design using the self-compensating fluid flow regulation device of FIG. 1 designed and particularly suited for high-speed motion.

As shown in FIG. 17, it is possible to configure the bearing whereby fluid under pressure enters the compensation unit through the supply hole 60. It fills the annulus 61 and flows across the compensation land 62 into the feedhole 63. The leakage flow out of the annulus 61 occurs across the land 64 and normally exits out via the groove 65, as in the embodiments of FIGS. 1 and 2. When the bearing is moving in the X direction, some of the leakage flow will cling to the surface of the bearing rail and be carried across the surface 64 and impinge upon the bearing land 66. As the velocity allowed by Equation 13 is surpassed, however, this impinging fluid is drawn into the bearing pocket 67 instead of air. For motion in the negative X direction, a second compensation unit like 60-61 can be used at the other end of the bearing (not shown); or an auxiliary groove 70 fed by an orifice 71 can be used. The flow out of the groove 70 across the lands 69 would add a small amount to the bearing load capacity and stiffness, and its main purpose would be to supply a flow source to the leading bearing land for high velocity motion.

Because of the robustness of the self-compensating hydrostatic or fluidstatic bearing design of the invention and its deterministic nature, it is especially suited to implementation in modular form as illustrated in FIGS. 1, 4, and 5. When desired, moreover, other pressurized fluids including air and other gases may also be employed. Further modifications of the invention will also occur to persons skilled in the art, and all such are deemed to fall within the spirit and scope of the invention as defined by the appended claims.

What is claimed is:

1. A fluidstatic bearing having a pair of parallel longitudinally extending opposing linear carriage bearing surfaces movable along a fluid layer-separated bearing rail having, in combination, on each said surface in seriatum, a longitudinally extending recess pocket intermediate of the surface, a transversely extending groove across the surface, and a substantially circular annular groove within which a central aperture region is disposed, with means for enabling pressurized fluid to flow into said circular annular groove and then through said central aperture region.

2. A fluidstatic bearing as claimed in claim 1 and in which means is provided for flowing fluid from the central aperture region of one bearing surface into the recess pocket of the opposed bearing surface.

3. A fluidstatic bearing as claimed in claim 1 and in which in advance of the longitudinally extending recess pocket of each bearing surface, further fluid supplying means is provided to prevent the entry of air at high bearing carriage velocities.

4. A fluidstatic bearing as claimed in claim 1 and in which the longitudinally extending recess pocket is of cross dimension large compared to that of the transversely extending groove and the circular annular groove which, in turn, are of comparably width.

5. A fluidstatic bearing as claimed in claim 1 and in which the transverse width of the longitudinal extending recess pocket is comparable with the outer diameter of the circular annular groove.

6. A fluidstatic bearing as claimed in claim 1 and in which the fluid is one of a gas and a liquid.

7. A fluidstatic bearing as claimed in claim 6 and in which said fluid is one of air and water.

8. A hydrostatic bearing comprising a rail and a bearing carriage that is kept from making contact with said rail by pressurized bearing pockets of fluid filling the gap therebetween wherein the fluid flow to a bearing pocket is regulated by a compensation device located opposite to said pocket such that displacements of the bearing caused by applied loads cause the bearing gap to decrease in the region of said pocket, in turn causing the bearing gap to increase in the region of said fluid flow regulation compensation device; said compensation device comprising a central depressed aperture region that is connected to said pocket, an elevated land region that surrounds said central aperture depressed region, an annular depressed groove pressure source region that surrounds said land region and which is connected to a fluid pressure source such that fluid flow is regulated from the said groove pressure source region to the said central depressed aperture region by the gap and the size and shape of the said land region, said groove pressure source region being prevented from leaking fluid to the outside by a large elevated land region surrounding said groove pressure source region.

9. The hydrostatic bearing of claim 8 wherein said central depressed aperture region, the first-named land region, and said groove pressure source region are of a shape that allows the fluid resistances between the regions to be calculated in a simple deterministic manner with great accuracy using basic equations of fluid dynamics.

10. The hydrostatic bearing of claim 9 wherein said central depressed aperture region, said land region, and said groove pressure source region are all circular.

11. The hydrostatic bearing of claim 8 wherein one such said compensation device is located at each end of said bearing, supplying fluid to one or two pockets opposite them, thereby allowing the leakage flow from said compensation devices to be drawn by viscous shear into the leading edges of said pockets to prevent air from being drawn into said pockets when said bearing carriage is moving at high speed.

12. In a linear motion fluidstatic bearing having opposed carriage bearing surfaces receiving a bearing rail therealong and therebetween and each bearing surface having similar and symmetrical pockets in the surface from which pressure fluid emanates to provide a thin film of fluid interposed in the gaps between the rail and the carriage surfaces, a method of self-compensating for load variation on either side of the bearing, that comprises, introducing on each bearing surface, longitudinally spaced from the corresponding pocket, a pressurized fluid-receiving groove of analytically representable geometry from which the fluid is fed externally of said surfaces from each groove to the pocket of the oppositely disposed surface, with the resistance to fluid flow out of the groove being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with a differential pressure being established in the opposite pockets to compensate for such applied load, and in which each groove is formed in substantially circular annular form, with the pressurized fluid fed therein flowing over a surface land within the circle and into a substantially center aperture for feeding into the pocket of the oppositely disposed bearing surface.

13. A method as claimed in claim 12 and in which a transversely extending groove is formed between the pocket and the first-named groove on each said surface to exit leakage flow external of the first-named groove.

14. In a linear motion fluidstatic bearing having opposed carriage bearing surfaces receiving a bearing rail therealong and therebetween and each bearing surface having similar and symmetrical pockets in the surface from which pressure fluid emanates to provide a thin film of fluid interposed in the gaps between the rail and the carriage surfaces, a method of self-compensating for load variation on either side of the bearing, that comprises, introducing on each bearing surface, longitudinally spaced from the corresponding pocket, a pressurized fluid-receiving groove of analytically representable geometry from which the fluid is fed externally of said surfaces from each groove to the pocket of the oppositely disposed surface, with the resistance to fluid flow out of the groove being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with a differential pressure being established in the opposite pockets to compensate for such applied load, and in which a transversely extending groove is formed between the pocket and the first-named groove on each said surface to exit leakage flow external of the first-named groove, and in which further fluid is supplied to the leading edge of the pocket to prevent air from being drawn thereinto when the bearing carriage is moving at high speed.

15. A method as claimed in claim 14 and in which one of a further pressurized fluid-receiving groove similar to said first-named groove or a further transversely extending fluid receiving auxiliary groove is formed in each bearing surface to the side of its pocket opposite to the first-named groove to supply such further fluid.

16. A linear motion fluidstatic bearing having in combination, a pair of opposed carriage bearing surfaces receiving a bearing rail therealong and therebetween and each bearing surface having similar pockets in the surface from which pressurized fluid may emanate to provide a thin film of fluid interposed in the gaps between the rail and the carriage bearing surfaces; each bearing surface being provided, longitudinally spaced from its corresponding pocket, with a pressurized fluid-receiving groove of analytically representable geometry; means for feeding the pressurized fluid from each said groove externally of said surfaces to the pocket of the oppositely disposed bearing surface, with the resistance of fluid flow out of the groove being adjusted to equal a proportion of the resistance to fluid flow out of the opposite surface pocket when the bearing is at nominal equilibrium and gap, unloaded by external forces; and means for applying the pressurized fluid to the grooves whereby, as external forces are applied to the bearing, the fluid flow is regulated to self-compensate for the load proportionately to variation in the bearing gap caused by the applied load, with a differential pressure being established in the opposite pockets to compensate for such applied load, and in which said pressurized fluid-receiving grooves are of substantially circular annular contours with a circular land surface enclosed by each circular annular groove and over which the pressurized fluid from such groove flows into a substantially central aperture for feeding into the pocket of the oppositely disposed bearing surface, and in which the pressurized-fluid applying means feeds the fluid from a source to an aperture within the circular annular groove.

17. A fluidstatic bearing as claimed in claim 16 wherein said bearing carriage is a small modular carriage that only provides one translational degree of restraint, said bearing being boltable to a table to help support and guide its motion.

18. Two modular fluidstatic bearing carriages as claimed in claim 17 connected to support and guide the motion of a table so that the table only has one degree of freedom along its intended direction of motion, and is restrained with high stiffness along the two translational directions orthogonal to the direction of intended motion, and rotationally about all three axes.

19. A fluidstatic bearing as claimed in claim 16 wherein said bearing carriage is a small modular carriage that only provides two translational degrees of restraint, said bearing being boltable to a table to help support and guide its motion.

20. A linear motion fluidstatic bearing having in combination, a pair of opposed carriage bearing surfaces receiving a bearing rail therealong and therebetween and each bearing surface having similar pockets in the surface from which pressurized fluid may emanate to provide a thin film of fluid interposed in the gaps between the rail and the carriage bearing surfaces; each bearing surface being provided, longitudinally spaced from its corresponding pocket, with a pressurized fluid-receiving groove of analytically representable geometry; means for feeding the pressurized fluid from each said groove externally of said surfaces to the pocket of the oppositely disposed bearing surface, with the resistance of fluid flow out of the groove being adjusted to equal a proportion of the resistance to fluid flow out of the opposite surface pocket when the bearing is at nominal equilibrium position and gap, unloaded by external forces; and means for applying the pressurized fluid to the grooves whereby, as external forces are applied to the bearing, the fluid flow is regulated to self-compensate for the load proportionately to variation in the bearing gap caused by the applied load, with a differential pressure being established in the opposite pockets to compensate for such applied load, and in which said pressurized fluid-receiving grooves are of substantially circular annular contours with a circular land surface enclosed by each circular annular groove and over which the pressurized fluid from such groove flows into a substantially central aperture for feeding into the pocket of the oppositely disposed bearing surface, and in which a further groove is provided transversely extending across each bearing surface between the corresponding pocket and circular annular groove for exiting fluid leakage flow along said surface external to the circular annular groove.

21. A fluidstatic bearing as claimed in claim 20 and in which, on the opposite side of said pocket from the circular annular groove, a further transversely extending groove is also provided.

22. A fluidstatic bearing as claimed in claim 20 and in which a further circular annular groove is provided in the bearing surface on the opposite side of its corresponding pocket from the first-named circular annular groove.

23. A fluidstatic bearing as claimed in claim 20 and in which a further fluid-supplying groove means is provided in the bearing surface on the opposite side of its corresponding pocket from the circular annular groove to supply further fluid to the leading edge of the pocket to prevent air from being drawn thereinto when the bearing carriage moves at high speed.

* * * * *